(12) United States Patent
Andersson

(10) Patent No.: US 9,605,684 B2
(45) Date of Patent: Mar. 28, 2017

(54) PUMP INCLUDING GAP ARRANGEMENT FOR IMPROVED PUMPING OF SOLID MATTER

(71) Applicant: XYLEM IP Holdings LLC, White Plains, NY (US)

(72) Inventor: Patrik Andersson, Skogås (SE)

(73) Assignee: XYLEM IP HOLDINGS LLC, White Plains, NY (US)

( * ) Notice: Subject to any disclaimer, the term of this patent is extended or adjusted under 35 U.S.C. 154(b) by 407 days.

(21) Appl. No.: 14/350,146

(22) PCT Filed: Oct. 4, 2012

(86) PCT No.: PCT/IB2012/055325
§ 371 (c)(1),
(2) Date: Apr. 7, 2014

(87) PCT Pub. No.: WO2013/050956
PCT Pub. Date: Apr. 11, 2013

(65) Prior Publication Data
US 2014/0308142 A1 Oct. 16, 2014

(30) Foreign Application Priority Data

Oct. 6, 2011 (SE) ...................................... 1150922

(51) Int. Cl.
*F04D 29/12* (2006.01)
*F04D 7/04* (2006.01)
(Continued)

(52) U.S. Cl.
CPC ............. *F04D 29/126* (2013.01); *F04D 7/04* (2013.01); *F04D 29/106* (2013.01); *F16J 15/164* (2013.01); *F16J 15/44* (2013.01)

(58) Field of Classification Search
CPC ........ F04D 29/106; F04D 29/126; F04D 7/04; F16J 15/164; F16J 15/44
(Continued)

(56) References Cited

U.S. PATENT DOCUMENTS 2,946,609 A 7/1960 Comery
4,472,109 A 9/1984 Blum
(Continued)

FOREIGN PATENT DOCUMENTS

IT EP 1247990 A1 * 10/2002 ......... F04D 29/0413

*Primary Examiner* — Nicholas J Weiss
*Assistant Examiner* — Paul Thiede
(74) *Attorney, Agent, or Firm* — Browdy and Neimark, PLLC

(57) ABSTRACT

The invention relates to a pump for pumping contaminated liquid comprising solid matter, the pump comprising a hydraulic unit (2), a drive unit (3), and a sealing unit (4), the hydraulic unit having a pump chamber (5) and an impeller (8) that is suspended in a drive shaft (9), said impeller and said drive shaft forming a rotatable unit, the sealing unit comprising a seal housing cover (15) that delimits said pump chamber (5) and that forms a seat for a drive shaft sealing assembly (16), the seal housing cover (15) comprising a first gap-delimiting part (20) and the rotatable unit comprising a second gap-delimiting part (21), which jointly define an axially extending gap (22) situated in the pump chamber. The pump is characterized in that, in each arbitrary radially extending plane taken through said gap (22), the first gap-delimiting part (20) has a broken circular outer gap-delimiting surface (23) at the same time as the second gap-delimiting part (21) has a broken circular inner gap-delimiting surface (24).

14 Claims, 3 Drawing Sheets

(51) Int. Cl.
  *F04D 29/10* (2006.01)
  *F16J 15/16* (2006.01)
  *F16J 15/44* (2006.01)
(58) Field of Classification Search
  USPC .................................. 415/231, 121.1, 170.1
  See application file for complete search history.

(56) References Cited

U.S. PATENT DOCUMENTS

2009/0022582 A1*  1/2009  Andersson .......... F04D 15/0033
                                                   415/170.1
2009/0123270 A1*  5/2009  Andersson .......... F04D 29/2288
                                                   415/140

* cited by examiner

US 9,605,684 B2

PUMP INCLUDING GAP ARRANGEMENT FOR IMPROVED PUMPING OF SOLID MATTER

TECHNICAL FIELD OF THE INVENTION

The present invention relates generally to a pump for pumping contaminated liquid comprising solid matter, such as agricultural waste or the like. In particular, the present invention relates to a pump comprising a hydraulic unit, a drive unit, and a sealing unit situated between the hydraulic unit and the drive unit, wherein the hydraulic unit has a pump chamber and, in said pump chamber, a rotatable open impeller that is suspended in a drive shaft extending from the drive unit through the sealing unit, said impeller and said drive shaft forming a rotatable unit, the sealing unit having a seal housing including a seal housing cover that in the axial direction delimits said pump chamber and that forms a seat for a drive shaft sealing assembly included in the sealing unit, said seal housing cover comprising a first gap-delimiting part and said rotatable unit comprising a second gap-delimiting part, which jointly define an axially extending gap situated in the pump chamber.

BACKGROUND OF THE INVENTION AND PRIOR ART

Pumps intended for pumping contaminated liquid comprising solid matter generally comprise a so-called upper gap that divides the pump chamber of the pump into a first part where the impeller of the pump is situated, and a second part where the drive shaft sealing assembly of the pump is adjoining. The primary object of the gap is to prevent impurities that are found in the pumped liquid from coming into contact with and thereby risk destroying the drive shaft sealing assembly.

Agricultural waste consists of water, urine, cattle manure, straw bedding, etc., that is, the solid matter consists of long-fibred, cellulose-containing constituents such as straw from the bed of the cattle, non-decomposed organic material in the form of stems and other hay constituents from the cattle manure, etc. It should be pointed out that other applications that are intended to pump solid matter, and then in particular solid matter with long-fibred, cellulose-containing constituents, are impaired by similar problems, which hereinbelow will be described exemplified in the context of the pumping of agricultural waste, without because of this being limited thereby.

Contaminated liquid comprising agricultural waste and the like is a disadvantageous liquid to pump, because of the solid matter attaching to, among other things, the surfaces that define the above-mentioned gap, which leads to clogging of the gap and the risk of solid matter filling and cramming the space between the upper cover plate of the impeller and the seal housing cover. These problems result in imbalance in the rotating unit, detrimental lateral forces and retarding frictional forces, which leads to the risk of breakage of the pump and above all the drive unit of the pump.

In applications that are utmost cumbersome, there is in practice only one solution to solve the problem of clogging, namely to increase the width of said gap to become 2-3 times wider than usual, that is, the width of the gap is increased to several millimetres. However, it has turned out that an increase of the width of the gap entails that the drive shaft sealing assembly has a greater tendency to be damaged, and if the drive shaft sealing assembly is damaged, pumped liquid leaks into the sealing unit and the drive unit, and this in turn leads to total loss of the pump.

Today, there are also other attempts to prevent the so-called upper gap from clogging, see, for instance, U.S. Pat. No. 4,472,109 and SE 391 008. However, the device shown in these documents is explicitly arranged in such a way that the surfaces that mutually delimit the upper gap should contain recesses at the same time as the recesses must not extend axially along the entire upper gap, i.e., that the two gap-delimiting surfaces should have rotationally symmetrical surfaces with the purpose of keeping the cross-sectional area of the gap at a minimum. Furthermore, the embodiment examples shown should have recesses with axially extending edges on the inner as well as the outer gap-delimiting surface, which entails an imminent risk of said edges hooking up in each other and damaging the pump.

BRIEF DESCRIPTION OF THE OBJECTS OF THE INVENTION

The present invention aims at obviating the above-mentioned disadvantages and failings of previously known pumps and at providing an improved pump. A primary object of the invention is to provide an improved pump that is of the type defined by way of introduction and has an upper gap that is not clogging or does not risk being damaged.

Another object of the present invention is to provide a pump, the drive shaft sealing assembly of which does not risk being damaged because of undesired, unallowed deflection of the drive shaft.

Another object of the present invention is to provide a pump in which the space between the upper cover plate of the impeller and the seal housing cover does not risk cramming.

BRIEF DESCRIPTION OF THE FEATURES OF THE INVENTION

According to the invention, at least the primary object is achieved by means of the pump that is defined by way of introduction and has the features defined in the independent claim. Preferred embodiments of the present invention are furthermore defined in the depending claims.

According to the present invention, there is provided a pump that is of the type defined by way of introduction and that is characterized in that, in each arbitrary radially extending plane taken through said gap, the first gap-delimiting part has a broken circular outer gap-delimiting surface at the same time as the second gap-delimiting part has a broken circular inner gap-delimiting surface.

Thus, the present invention is based on the understanding that, by the arrangement of recesses in the two gap-delimiting surfaces in such away that an overlap between them occurs along the entire axial length of the axially extending gap, clogging of the gap will in all essential respects cease, in that no rotationally symmetrical gap-delimiting surface is present where solid matter can be smeared and accumulated.

According to a preferred embodiment of the present invention, the first gap-delimiting part has, in each arbitrary axially extending plane projecting from an axially extending rotation axis of the rotatable unit and taken through said gap, at least one sub-segment of the outer gap-delimiting surface, while forming a circumferential outer gap-delimiting surface. This implies that the first gap-delimiting part does not comprise any axially extending sharp edge that runs along the axial extension of the entire gap, and thereby possible axially extending edges of the second gap-delimiting part do not risk getting caught and being damaged.

According to a preferred embodiment, the first gap-delimiting part of the seal housing cover is a stationary insert ring having a centrally located through hole.

According to a preferred embodiment, said circumferential, outer gap-delimiting surface has a circumferential wave-shaped lower edge facing towards the impeller and/or a circumferential wave-shaped upper edge facing towards the sealing unit. In a further preferred embodiment, the first gap-delimiting part of the seal housing cover comprises an endless circumferential, outer gap-delimiting surface. This entails that solid matter ending up in said gap will be scraped off and primarily be brought downward toward the pump and secondarily upward toward the sealing unit, with the purpose of keeping the gap clean from solid matter.

According to a preferred embodiment, the second gap-delimiting part of the rotatable unit is a tubular element, which preferably is a part of said impeller.

According to a preferred embodiment of the present invention, said gap has a width in the radial direction that is smaller than 1 mm, preferably about 0.25 mm. Upon deflection of the drive shaft, this makes the first gap-delimiting part and the second gap-delimiting part to momentary abut each other, which stops undue deflection and prevents the drive shaft sealing assembly from being damaged.

Additional advantages and features of the invention are seen in the other dependent claims as well as in the following, detailed description of preferred embodiments.

BRIEF DESCRIPTION OF THE DRAWINGS

A more complete understanding of the above-mentioned and other features and advantages of the present invention will be clear from the following, detailed description of preferred embodiments, reference being made to the accompanying drawings, wherein.

DETAILED DESCRIPTION OF PREFERRED EMBODIMENTS

The present invention relates generally to a pump for pumping contaminated liquid comprising solid matter, such as agricultural waste.

Figure 1:
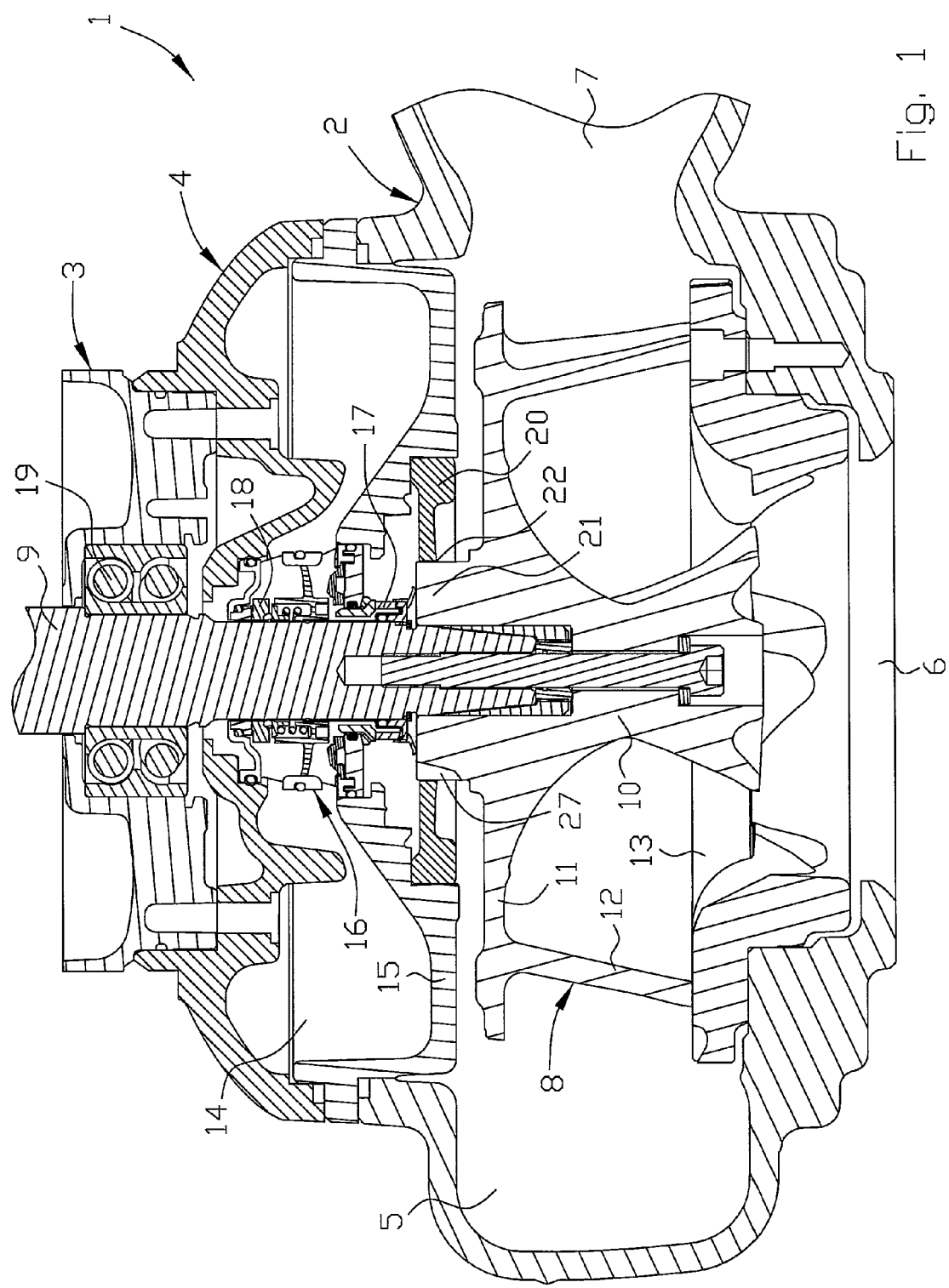
FIG. 1 is a cross sectioned side view of a part of a pump according to the invention.

Reference is initially made to FIG. 1, wherein a part of a pump according to the invention, generally designated 1, is shown. In the embodiment shown, the pump 1 according to the invention is exemplified by means of a submersible centrifugal pump intended to pump liquid comprising agricultural waste; however, it should be pointed out that the pump type and the application are not limiting to the present invention.

The pump 1 according to the invention comprises a hydraulic unit 2, a drive unit 3, and a sealing unit 4 situated between the hydraulic unit 2 and the drive unit 3. It should be pointed out that the major part of the drive unit 3 is neither treated in this publication nor shown in the accompanying figures, since the drive unit is of a known type and has no impact on the present invention.

The hydraulic unit 2 has a pump chamber 5, which in the embodiment shown is in fluid communication with an axial inlet 6 and a radial outlet 7. Furthermore, the hydraulic unit 2 has an impeller 8 that is rotatable in said pump chamber 5 and suspended in a drive shaft 9 extending from the drive unit 3 through the sealing unit 4. Said impeller 8 and said drive shaft 9 together constitute a commonly rotatable unit, and the impeller 8 is secured to a free lower end of the drive shaft 9 in a conventional way. In the embodiment shown, the impeller 8 is an open impeller having a hub 10, an upper cover plate 11 radially projecting from said hub 10, and at least one blade 12 connected with said upper cover plate 11. In the embodiment shown, the hydraulic unit 2 also comprises a so-called suction cover 13, in the form of a releasable insert ring, arranged adjacent to the inlet 6 of the hydraulic unit 2. The suction cover 13 co-operates with the at least one blade 12 of the impeller 8, and in the embodiment shown, the suction cover 13 is arranged to, together with the blade 12 of the impeller 8, split large fragments of solid matter present in the pumped liquid in order to prevent clogging of the impeller 8.

The sealing unit 4 has a seal housing, which delimits a chamber 14 that accommodates a liquid, preferably oil. The seal housing comprises a seal housing cover 15, also called oil housing bottom, which in the axial direction delimits the chamber 14 of the seal housing from the pump chamber 5 and which forms a seat for a drive shaft sealing assembly, generally designated 16, included in the sealing unit 4. The drive shaft sealing assembly 16, also known as sealing cartridge, comprises an outer surface seal 17 that prevents the pumped liquid from leaking in from the pump chamber 5 to the chamber 14 of the seal housing, and an inner surface seal 18 that prevents passage of liquid between the chamber 14 of the seal housing and the drive unit 3. Instead of said surface seals, the drive shaft sealing assembly 16 may comprise other types of suitable seals, and alternatively the sealing unit 4 may comprise another type of sealing solution than said drive shaft sealing assembly.

The drive unit 3 comprises, among other things, the electric motor (not shown) of the pump 1, and a lower bearing 19 that surrounds and guides the drive shaft 9 of the pump 1 and that is arranged adjacent to the sealing unit 4. The bearing 19 is preferably a ball bearing.

Figure 2:
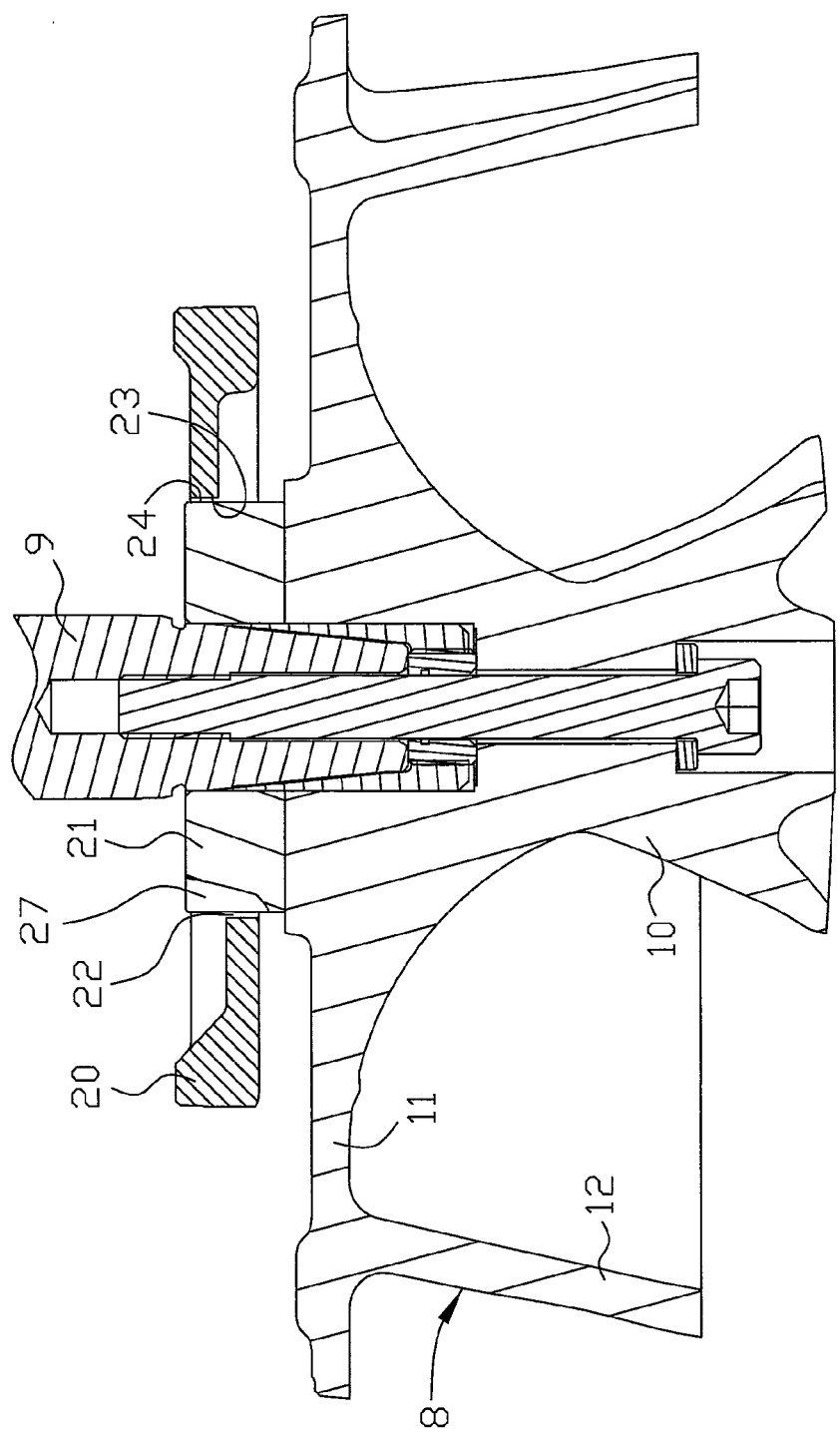
FIG. 2 is a schematic cross sectioned side view of a part of a rotatable unit according to an alternative embodiment as well as an insert ring, which together delimit the so-called upper gap of the pump.

Reference is now made also to FIG. 2, which shows an alternative embodiment of the present invention. According to the present invention, the seal housing cover 15 comprises a first gap-delimiting part 20 and the rotatable unit comprises a second gap-delimiting part 21, which jointly define an axially extending gap 22 situated in the pump chamber 5. Said gap 22 delimits the pump chamber 5 in a first part in which the impeller 8 is situated and a second part adjoined by the drive shaft sealing assembly. The first gap-delimiting part 20 has an outer gap-delimiting surface 23 that consists of the surface of the first gap-delimiting part 20 that directly delimits the gap 22, at the same time as the second gap-delimiting part 21 has an inner gap-delimiting surface 24 that consists of the surface of the second gap-delimiting part 21 that directly delimits said gap 22.

Furthermore, in each arbitrary radially extending plane taken through said gap 22, the first gap-delimiting part 20 has a broken circular outer gap-delimiting surface 23, at the same time as the second gap-delimiting part 21 has a broken circular inner gap-delimiting surface 24. In other words, the outer gap-delimiting surface 23 of the first gap-delimiting part 20 and the inner gap-delimiting surface 24 of the second gap-delimiting part 21 are inscribed on the respective circles of different size; however, neither the outer gap-delimiting surface 23 of the first gap-delimiting part 20 nor the inner gap-delimiting surface 24 of the second gap-delimiting part 21 follow the respective circles these are inscribed on in any radial cross-section taken through the gap 22, but have one or more interruptions generated by recesses.

In a preferred embodiment of the pump 1 according to the invention, the first gap-delimiting part 20 has at least one sub-segment of the outer gap-delimiting surface 23, in each arbitrary axially extending plane taken projecting from an axially extending rotation axis of the rotatable unit and taken through said gap 22. It should be pointed out that by the expression axially extending plane taken projecting from an axially extending rotation axis, reference is made to a plane, one limiting edge of which consists of said rotation axis and which has to be turned 360° about the rotation axis in order to cover the entire gap 22.

Figure 3:
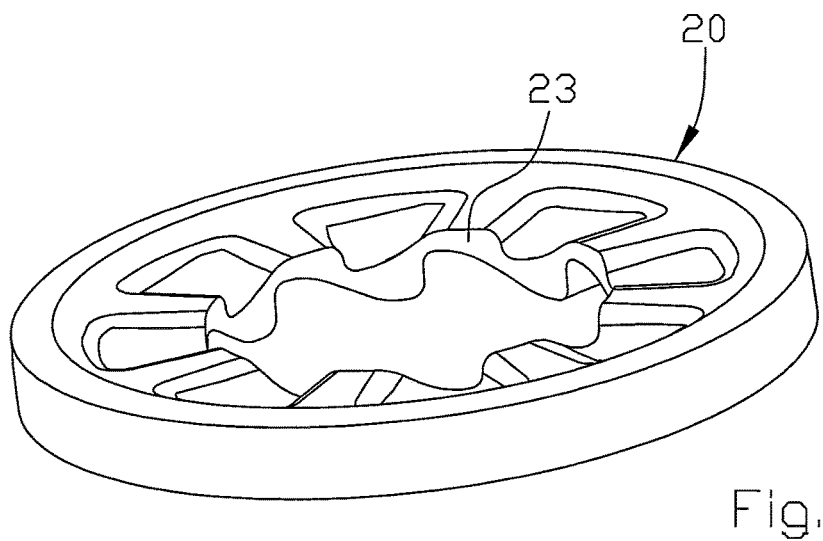
FIG. 3 is a perspective view from above of a preferred embodiment of an insert ring of a pump according to the invention.
Figure 4:
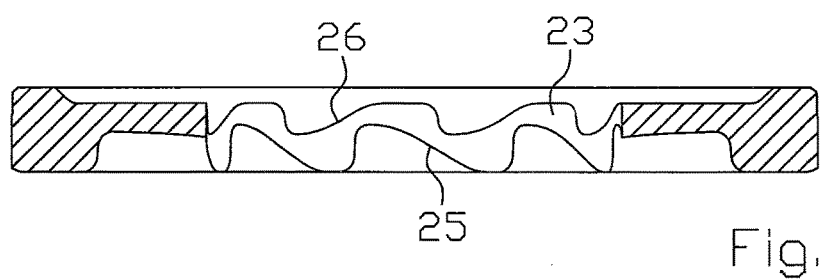
FIG. 4 is a cross sectioned side view of the insert ring according to FIG. 3.

Reference is now made above all to FIGS. 3 and 4, which show a preferred embodiment of the first gap-delimiting part 20.

In the embodiment examples shown, the first gap-delimiting part 20 of the seal housing cover 15 is a stationary insert ring having a centrally situated through hole, which is delimited by the outer gap-delimiting surface 23 of the first gap-delimiting part. In an alternative embodiment (not shown), the first gap-delimiting part is an integrated part of the seal housing cover 15.

Preferably, the outer gap-delimiting surface 23 of the first gap-delimiting part 20 is endlessly circumferential. Alternatively, the outer gap-delimiting surface 23 of the first gap-delimiting part 20 may be circumferential by having at least one helical turn, or be circumferential by having several separate sub-turn segments that, in the circumferential direction, are arranged adjacent or overlapping each other. Thus, by circumferential, reference is made to an axial projection of the outer gap-delimiting surface 23 of the first gap-delimiting part 20 forming an entire circle, and by endlessly circumferential, reference is made to the outer gap-delimiting surface of the first gap-delimiting part 20 being continuous in the circumferential direction.

According to the shown preferred embodiment, the circumferential outer gap-delimiting surface 23 of the first gap-delimiting part 20 has a circumferential wave-shaped lower edge 25 that, in the mounted state, is facing towards the upper cover plate 11 of the impeller 8. To the greatest part, the lower edge 25 consists of sub-edges that lean downward toward the upper cover plate 11 of the impeller 8 and in the direction of rotation of the impeller 8. The wave-shaped configuration of the lower edge 25 entails that solid matter that ends up in the gap 22 and that engages the lower edge 25 will be forced out of the gap 22 toward the impeller 8.

Preferably, also the circumferential outer gap-delimiting surface 23 of the first gap-delimiting part 20 has a circumferential wave-shaped upper edge 26 facing toward the sealing unit 4, and the drive shaft sealing assembly 16. The upper edge 26 comprises sub-edges that lean upward toward the sealing unit 4 and in the direction of rotation of the impeller 8. The wave-shaped configuration of the upper edge 26 entails that solid matter that ends up in the gap 22 and that engages the upper edge 26 will be forced out of the gap 22 toward the sealing unit 4.

Preferably, the recesses forming the wave-shaped lower edge 25 have a greater axial extension than the recesses that form the wave-shaped upper edge 26. The wave recesses of the lower edge 25 should be arranged at a greater distance from the upper cover plate 11 of the impeller 8 than the wave recesses of the upper edge 26, which implies that the outer gap-delimiting surface 23 of the first gap-delimiting part 20 has no rotationally symmetrical surface.

In the embodiment having a helical circumferential outer gap-delimiting surface 23 of the first gap-delimiting part 20, the helical shape should be directed in such a way that solid matter ending up in the gap 22 is forced toward the impeller 8 and not toward the sealing unit 4. In the embodiment where the circumferential outer gap-delimiting surface 23 of the first gap-delimiting part 20 has several separate sub-turn segments that, in the circumferential direction, are arranged adjacent or overlapping each other, at least half of the sub-turn segments should lean toward the impeller 8 in such a way that the majority of solid matter ending up in the gap 22 is forced toward the impeller 8.

Figure 5:
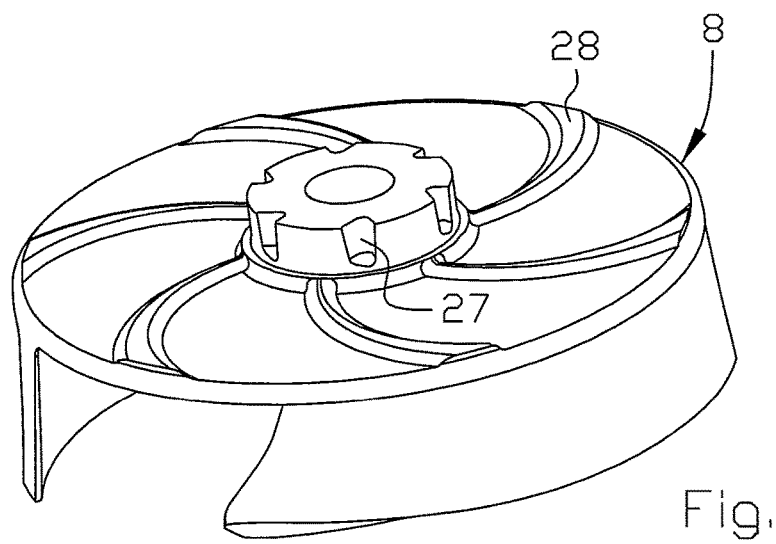
FIG. 5 is a perspective view from above of a preferred embodiment of an impeller of a pump according to the invention.

Reference is now made primarily to FIGS. 2 and 5. The second gap-delimiting part 21 of the rotatable unit is preferably a tubular element. This tubular element may be an individual detail connected to the impeller 8 and/or the drive shaft 9, as is seen in FIG. 2; however, the tubular element is preferably an integrated part of the impeller 8 and constitutes a part of the hub 10 of the impeller 8, as is seen in FIG. 5. In an alternative embodiment (not shown), the second gap-delimiting part 21 is an integrated part of the drive shaft 9.

Preferably, the inner gap-delimiting surface 24 of the second gap-delimiting part has a cylindrical basic shape that has at least one recess 27, which extends along the entire axial extension of the gap 22. Preferably, said at least one recess 27 is axially extending. In an alternative embodiment (not shown), the inner gap-delimiting surface 24 of the second gap-delimiting part 21 has at least two recesses, one of which of said at least two recesses extends in the direction from the upper cover plate 11 of the impeller 8 but ends at a distance from the upper mouth of the gap 22, and the other one of said at least two recesses extends in the direction from the sealing unit 4 but ends at a distance from the lower mouth of the gap 22.

The gap 22 should be situated at as short a radial distance as possible in relation to the rotation axis of the rotating unit, with the purpose of obtaining as large a power as possible to remove solid matter that has ended up in the gap 22.

According to a preferred embodiment, the gap 22 has a width in the radial direction that is smaller than 1 mm, preferably smaller than 0.5 mm, more preferably smaller than 0.3 mm, and most preferably about 0.25 mm. This implies that possible deflection of the drive shaft 9 is limited in spite of this causing the gap to become narrower; however, the narrower gap and the design of the outer gap-delimiting surface 23 of the first gap-delimiting part 20 and of the inner gap-delimiting surface 24 of the second gap-delimiting part 21 entail that solid matter ending up in the gap immediately is removed and clogging of the gap 22 is prevented.

In addition, the impeller 8 may be provided with back vanes 28, which assist in pumping away the solid material that is trying to reach the gap 22, or that has been thrown out from the gap 22, which counteracts cramming of the space between the upper cover plate 11 of the impeller 8 and the seal housing cover 15.

FEASIBLE MODIFICATIONS OF THE INVENTION

The invention is not limited only to the embodiments described above and shown in the drawings, which only have illustrating and exemplifying purpose. This patent application is intended to cover all adaptations and variants of the preferred embodiments described herein, and consequently the present invention is defined by the wording of the accompanying claims and the equivalents thereof. Accordingly, the equipment may be modified in all feasible ways within the scope of the accompanying claims.

It should be pointed out that the axial length of the gap according to the invention consists of the distance between the two radially extending planes, which comprise at least one segment of the outer gap-delimiting surface of the first gap-delimiting part as well as one segment of the inner gap-delimiting surface of the second gap-delimiting part, and which are situated at the greatest distance from each other. Thus, in the shown preferred embodiment, the axial length of the gap is the distance between the wave crest of the upper edge and the wave crest of the lower edge of the outer gap-delimiting surface of the first gap-delimiting part.

It should also be pointed out that all information about/regarding terms such as above, below, upper, under, etc., should be interpreted/read with the equipment oriented in accordance with the figures, with the drawings oriented in such a way that the reference designations can be read in a proper way. Accordingly, such terms only indicate mutual relationships in the shown embodiments, which relationships may be changed if the equipment according to the invention is provided with another construction/design.

It should be pointed out that even if it is not explicitly mentioned that features from one specific embodiment can be combined with the features of another embodiment, this should be regarded as evident when possible.

Throughout this specification and in the subsequent claims, unless the context indicates something different, it will be appreciated that the word "comprise", and variants such as "comprises" or "comprising", means inclusion of indicated unit or step or group of units or steps but not exclusion of other units or steps or groups of units or steps.

The invention claimed is:

1. A pump for pumping contaminated liquid comprising solid matter, comprising a hydraulic unit (2), a drive unit (3), and a sealing unit (4) situated between the hydraulic unit and the drive unit,
    the hydraulic unit has a pump chamber (5) and, in said pump chamber, a rotatable open impeller (8) that is suspended in a drive shaft (9) extending from the drive unit through the sealing unit, said impeller and said drive shaft forming a rotatable unit,
    the sealing unit has a seal housing including a seal housing cover (15) that in the axial direction delimits said pump chamber (5) and that forms a seat for a drive shaft sealing assembly (16) included in the sealing unit, said seal housing cover (15) comprising a first gap-delimiting part (20) and said rotatable unit comprising a second gap-delimiting part, (21) which jointly define an axially extending gap (22) situated in the pump chamber, the first gap-delimitating part (20) including an inner wave-shaped surface (23) and the second gap-delimiting part (21) including an outer surface that defines a plurality of recesses (27) formed therein,
    wherein, each recess of the plurality of recesses (27) of the second gap delimiting part (21) has an opposed, facing relationship with the inner wave-shaped surface (23) of the first gap-delimiting part (20).

2. The pump according to claim 1, wherein the first gap-delimiting part of the seal housing cover (15) is a stationary insert ring (20) comprising a centrally located through hole.

3. The pump according to claim 1, wherein, the inner wave-shaped surface (23) is formed as an inbound circumferential surface of the first-gap delimiting part (20) and comprises a plurality of wave-shaped segments.

4. The pump according to claim 3, wherein said circumferential outer gap-delimiting surface (23) has a circumferential wave-shaped lower edge (25) facing towards the impeller (8).

5. The pump according to claim 3, wherein said circumferential outer gap-delimiting surface (23) has a circumferential wave-shaped upper edge (26) facing towards the sealing unit (4).

6. The pump according to claim 3, wherein the inner wave shaped surface (23) comprises a continuous surface.

7. The pump according to claim 1, wherein the second gap-delimiting part of the rotatable unit is a tubular element (21).

8. The pump according to claim 7, wherein the tubular element (21) is an integrated part of said impeller (8).

9. The pump according to claim 1, wherein the plurality of recesses (27) defined in the second gap-delimiting part (21) each extend along the entire axial extension of the gap (22).

10. The pump according to claim 1, wherein said gap (22) has a width in the radial direction that is smaller than 1 millimeter.

11. The pump according to claim 10, wherein the width of the gap (22) in the radial direction is smaller than 0.5 millimeter.

12. The pump according to claim 10, wherein the width of the gap (22) in the radial direction is smaller than 0.3 millimeter.

13. The pump according to claim 10, wherein the width of the gap (22) in the radial direction is smaller than about 0.25 millimeter.

14. The pump according to claim 1, wherein wherein the included drive shaft sealing assembly (16) of the sealing unit comprises an outer surface seal (17) and an inner surface seal (18), which jointly prevent the pumped liquid from passing from the hydraulic unit (2) to the drive unit (3).

* * * * *